United States Patent
Choi et al.

(10) Patent No.: US 10,655,568 B2
(45) Date of Patent: May 19, 2020

(54) FUEL VAPOR PURGE SYSTEM AND METHOD FOR DIAGNOSING LEAKAGE OF FUEL VAPOR USING THE SAME

(71) Applicants: Hyundai Motor Company, Seoul (KR); Kia Motors Corporation, Seoul (KR)

(72) Inventors: Choo Saeng Choi, Seongnam-si (KR); Il Nam Lee, Hwaseong-si (KR); Sang Bong Han, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 119 days.

(21) Appl. No.: 15/662,101

(22) Filed: Jul. 27, 2017

(65) Prior Publication Data
US 2018/0135565 A1    May 17, 2018

(30) Foreign Application Priority Data
Nov. 14, 2016  (KR) .................. 10-2016-0151254

(51) Int. Cl.
| | | |
|---|---|---|
| F02M 25/08 | (2006.01) | |
| F02D 41/00 | (2006.01) | |
| F02M 26/06 | (2016.01) | |
| F02M 26/22 | (2016.01) | |
| F02D 41/22 | (2006.01) | |

(52) U.S. Cl.
CPC ....... *F02M 25/0809* (2013.01); *F02D 41/004* (2013.01); *F02D 41/0007* (2013.01);
(Continued)

(58) Field of Classification Search
CPC .......... F02M 25/0809; F02M 25/0836; F02M 26/06; F02M 26/22; F02D 41/0032; F02D 41/22; F02D 41/004
(Continued)

(56) References Cited

U.S. PATENT DOCUMENTS 5,005,550 A * 4/1991 Bugin, Jr. ............ F02M 25/089
                                                            123/520
6,880,534 B2    4/2005 Yoshiki et al.
(Continued)

FOREIGN PATENT DOCUMENTS

| JP | 2004-308595 A | 11/2004 |
|---|---|---|
| JP | 2006-336553 A | 12/2006 |

(Continued)

*Primary Examiner* — Ngoc T Nguyen
(74) *Attorney, Agent, or Firm* — Morgan, Lewis & Bockius LLP (57) ABSTRACT

A fuel vapor purge system may include a turbocharger including a turbine disposed in an exhaust line, and a compressor; a canister connected to a fuel tank through a vapor line; a fuel pressure detector configured for detecting pressure in the fuel tank; a canister closing valve selectively closing an atmospheric path provided in the canister; a purge control solenoid valve disposed in a main purge line connected to the canister and selectively closing fuel vapor collected at the canister; a first check valve disposed in a first purge line and preventing the fuel vapor flowing along the first purge line from flowing reversely; a second check valve disposed in a second purge line preventing the fuel vapor flowing along the second purge line from flowing reversely; a differential pressure generating valve disposed in the intake line, and generating negative pressure; and an intake pressure sensor disposed in the intake line between the differential pressure generating valve and the compressor.

10 Claims, 5 Drawing Sheets

(52) U.S. Cl.
CPC ..... *F02D 41/0032* (2013.01); *F02D 41/0047* (2013.01); *F02D 41/22* (2013.01); *F02M 25/0836* (2013.01); *F02M 26/06* (2016.02); *F02M 26/22* (2016.02); *F02D 2200/0406* (2013.01); *F02D 2200/0602* (2013.01); *F02D 2200/1002* (2013.01); *F02D 2200/602* (2013.01); *F02D 2250/18* (2013.01); *Y02T 10/144* (2013.01); *Y02T 10/47* (2013.01)

(58) Field of Classification Search
USPC .......................................... 73/114.38, 114.39
See application file for complete search history.

(56) References Cited

U.S. PATENT DOCUMENTS

| | | | | |
|---|---|---|---|---|
| 7,284,541 | B1* | 10/2007 | Uchida | ................ F02M 25/089 123/520 |
| 2014/0251284 | A1 | 9/2014 | Plymale et al. | |
| 2015/0053186 | A1 | 2/2015 | Surnilla et al. | |
| 2016/0290285 | A1* | 10/2016 | Dudar | .................. F02M 25/089 |
| 2016/0368373 | A1* | 12/2016 | Dudar | .................. B60K 15/077 |
| 2016/0377031 | A1* | 12/2016 | Pursifull | ............ F02M 25/0836 60/602 |
| 2019/0048830 | A1* | 2/2019 | Akiyama | ................ F02B 37/00 |
| 2019/0072061 | A1* | 3/2019 | Asanuma | ......... F02M 35/10006 |

FOREIGN PATENT DOCUMENTS

| | | |
|---|---|---|
| JP | 2006-348901 A | 12/2006 |
| JP | 2012-122430 A | 6/2012 |
| JP | 2012-163061 A | 8/2012 |
| JP | 2013-160108 A | 8/2013 |
| JP | 2016-084797 A | 5/2016 |
| JP | 2017067043 A * | 4/2017 ............. F02B 37/00 |

* cited by examiner

FUEL VAPOR PURGE SYSTEM AND METHOD FOR DIAGNOSING LEAKAGE OF FUEL VAPOR USING THE SAME

CROSS-REFERENCE TO RELATED APPLICATION

The present application claims priority to Korean Patent Application No. 10-2016-0151254 filed on Nov. 14, 2016, the entire contents of which is incorporated herein for all purposes by this reference.

BACKGROUND OF THE INVENTION

Field of the Invention

The present invention relates to a fuel vapor purge system and a method for diagnosing leakage of a fuel vapor in the fuel vapor purge system. More particularly, the present invention relates to a fuel vapor purge system and a method for diagnosing leakage of a fuel vapor purge system that can increase purged fuel amount vapor and diagnose leakage of fuel vapor.

Description of Related Art

In the automobile industry, there have been a number of researches on improvement of emissions. In particular, in some countries, regulations are in force to reduce the total amount of vaporized fuel gas to 0.5 g/day or less in order to minimize emission of hydrocarbon (HC) included in the vaporized gas of gasoline fuel, and the total amount of vaporized fuel gas will be limited to 0.054 g/day or less.

In general, to meet the regulations, recently, the automobile industry minimizes the occurrence of the vaporized fuel gas, which penetrates a fuel tank, by improving a material of the fuel tank and optimizing connection structures, and on the other hand, the automobile industry adopts a vaporized fuel gas recirculation system in which a canister is applied to a fuel supply device.

Here, the canister contains an absorbent material which may absorb the vaporized fuel gas from the fuel tank that stores volatile fuel, and the canister is connected to the fuel tank and collects the vaporized fuel gas to prevent the vaporized fuel gas, which is evaporated from a float chamber of a vaporizer and the fuel tank, from being discharged into the atmosphere.

The vaporized fuel gas, which is collected in the canister as described above, is introduced back into an engine by a purge control solenoid valve (PCSV) controlled by an engine control unit (hereinafter, referred to as an 'ECU'), and then the vaporized fuel gas is combusted, such that the vaporized fuel gas is recirculated.

In a case in which an apparatus for purging the fuel vapor in the related art is used together with a turbocharger, there is a problem that purged fuel amount vapor is very small when the turbocharge is operated.

Further, to detect the leak of the fuel system, which is one of items required for diagnosing failures of all systems, and which influence the increase of the discharge gas of the vehicle, it is determined that an engine controller needs to accurately detect a leak equivalent to sizes of 0.5 mm and 1.0 mm required in current restriction regulations.

However, it is difficult diagnose leakage of fuel vapor in the fuel vapor purge system.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a fuel vapor purge system for increasing purge fuel amount vapor when a turbocharge is operated.

Further, various aspects of the present invention are directed to providing a method for diagnosing leakage fuel amount vapor in the fuel vapor purge system.

A fuel vapor purge system according to an exemplary embodiment of the present invention may include a turbocharger which includes a turbine disposed in an exhaust line through which exhaust gas discharged from an engine flows, and a compressor which rotates in conjunction with the turbine and compresses intake gas to be supplied into the engine; a canister which is connected to a fuel tank through a vapor line and collects fuel vapor of fuel stored in the fuel tank; a fuel pressure sensor which detects pressure in the fuel tank; a canister closing valve which selectively closes an atmospheric path provided in the canister; a purge control solenoid valve which is disposed in a main purge line connected to the canister and selectively closes fuel vapor collected at the canister; a first check valve which is disposed in a first purge line that branches off from the main purge line and merges into the intake line at a downstream portion of the compressor of the turbocharger, and prevents the fuel vapor flowing along the first purge line from flowing reversely; a second check valve which is disposed in a second purge line that branches off from the main purge line and merges into the intake line at an upstream portion of the compressor, and prevents the fuel vapor flowing along the second purge line from flowing reversely; a differential pressure generating valve which is disposed in the intake line at an upstream portion of the compressor, and generates negative pressure; and an intake pressure sensor which is disposed in the intake line between the differential pressure generating valve and the compressor.

The fuel vapor purge system may further include a controller which controls opening of the differential pressure generating valve and the canister closing valve according to an operation region of the turbocharger.

The controller may control that the differential pressure generating valve is opened in an operation region in which the turbocharger operates.

The controller may control that the differential pressure generating valve is closed by a predetermined value in an operation region in which the turbocharger does not operate.

The differential pressure generating valve may be closed at a maximum closing degree or less.

The maximum closing degree may be a closing degree of the differential pressure generating valve for maintaining output of the engine which is determined based on required torque for a driver.

The purge control solenoid valve may be controlled based on a collected amount of hydrocarbon in the canister.

The controller may determine a failure of the differential pressure generating valve by comparing an intake pressure which is varied according to closing degree of the differential pressure generating valve to a predetermined range.

The controller may determine whether fuel vapor is leaked in the purge lines by comparing the intake pressure to a pressure change rate of the fuel tank in a state where the differential pressure generating valve is closed by a predetermined value, the canister closing valve is closed, and the purge control solenoid valve is opened.

The fuel vapor purge system may further include a recirculation line which branches off from an exhaust line at a downstream side and coupled to the intake line between the compressor and the differential pressure generating valve; a recirculation cooler which is disposed in the recirculation line; and a recirculation valve which is disposed in the recirculation line.

A method for diagnosing leakage of a fuel vapor in a fuel vapor purge system including an engine, a turbocharger, and an exhaust gas recirculation apparatus according to another exemplary embodiment of the present invention may include determining, by a controller, whether an operation region is an operation region in which the turbocharger operates; adjusting, by the controller, an opening degree of a differential pressure generating valve disposed in an intake line at a upstream side of a compressor of the turbocharger based on the operation region in which the turbocharger operates;

determining, by the controller, a collected amount of hydrocarbon in a canister that collects fuel vapor generated in a fuel tank; controlling, by the controller, a purge control solenoid valve based on the collected amount of hydrocarbon; and determining, by the controller, whether fuel vapor is leaked in a purge line of the fuel vapor purge system.

The differential pressure generating valve may be opened in an operation region in which the turbocharger does not operate.

The differential pressure generating valve may be closed by a predetermined amount in an operation region in which the turbocharger operates.

The differential pressure generating valve may be closed at a maximum closing degree or less.

The maximum closing degree may be a closing degree of the differential pressure generating valve for maintaining output of the engine which is determined based on required torque for a driver.

The determining whether fuel vapor is leaked in an operation region in which the turbocharge operates may include closing the differential pressure generating valve by a predetermined amount; and comparing an intake pressure detected by an intake pressure sensor which is disposed in an intake line between the differential pressure generating valve and a compressor of the turbocharger to a predetermined range.

The determining whether fuel vapor is leaked in an operation region in which the turbocharge operate may include closing the differential pressure generating valve by a predetermined amount; closing a canister closing valve and opening a purge control solenoid valve; and comparing a change rate of the fuel tank pressure according to the intake pressure of the intake line.

It may be determined that fuel vapor is leaked in the purge lines when the change rate of the fuel tank pressure according to the intake pressure is beyond the predetermined range.

According to an exemplary embodiment of the present invention, it is possible to exactly diagnose a failure of a differential pressure generating valve and a leakage in a purge line by use of an intake pressure sensor disposed between the differential pressure generating valve and a compressor.

Further, negative pressure is formed in the intake line at the upstream side of the compressor by operation of the differential pressure generating valve disposed in the intake line at the upstream side of the compressor, such that a lot of fuel vapor is supplied to the combustion chamber in an operation region in which a turbocharger operates.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present application will be described more fully hereinafter with reference to the accompanying drawings, in which exemplary embodiments of the invention are shown. As those skilled in the art would realize, the described embodiments may be modified in various different ways, all without departing from the spirit or scope of the present invention.

A part irrelevant to the description will be omitted to clearly describe the present invention, and the same or similar constituent elements will be designated by the same reference numerals throughout the specification.

In addition, the size and thickness of each component illustrated in the drawings are arbitrarily shown for understanding and ease of description, but the present invention is not limited thereto. Thicknesses of several portions and regions are enlarged for clear expressions.

Hereinafter, a fuel vapor purge system according to an exemplary embodiment of the present invention will be described in detail with reference to accompanying drawings.

Figure 1:
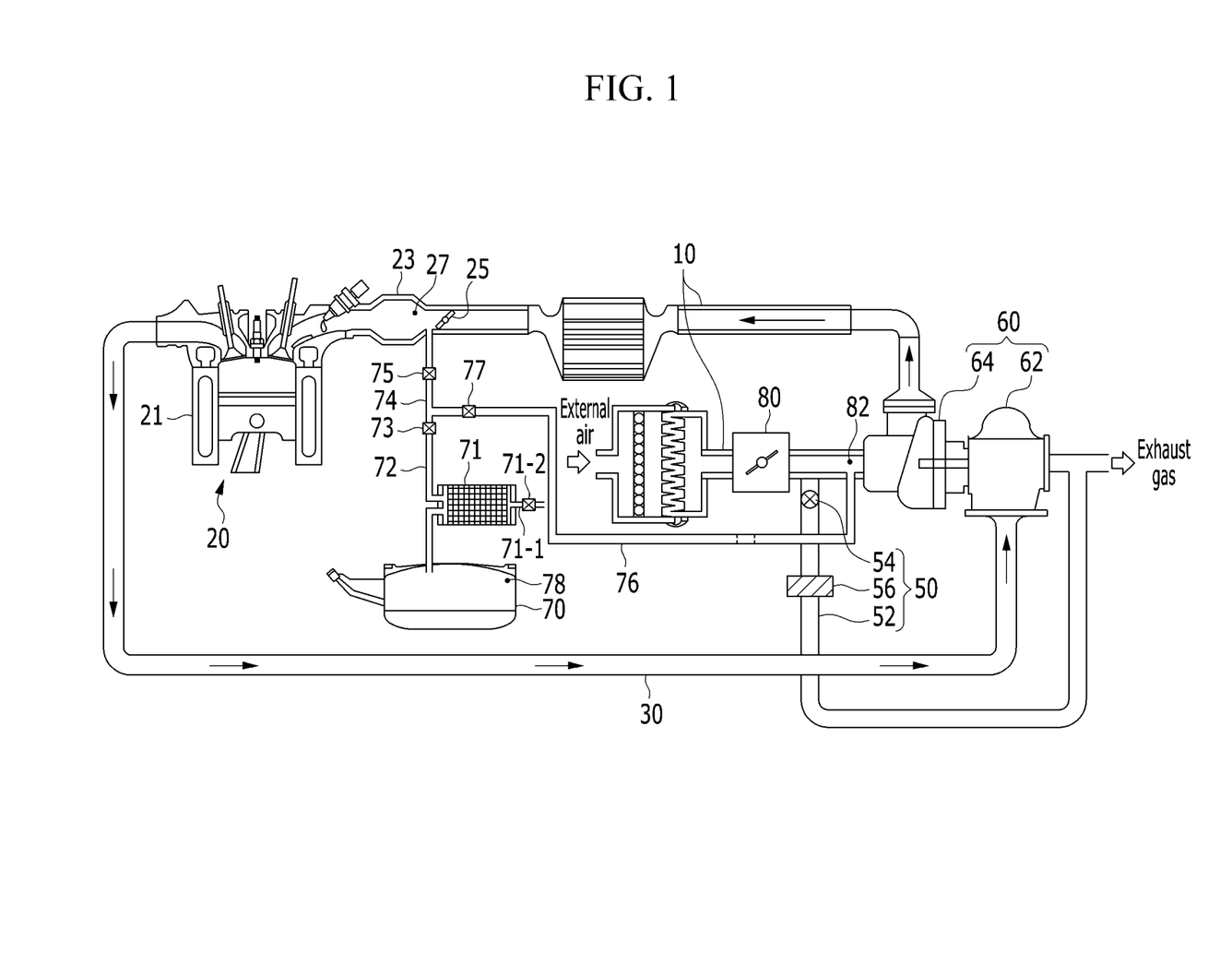
FIG. 1 is a schematic view illustrating a fuel vapor purge system according to an exemplary embodiment of the present invention.
Figure 2:
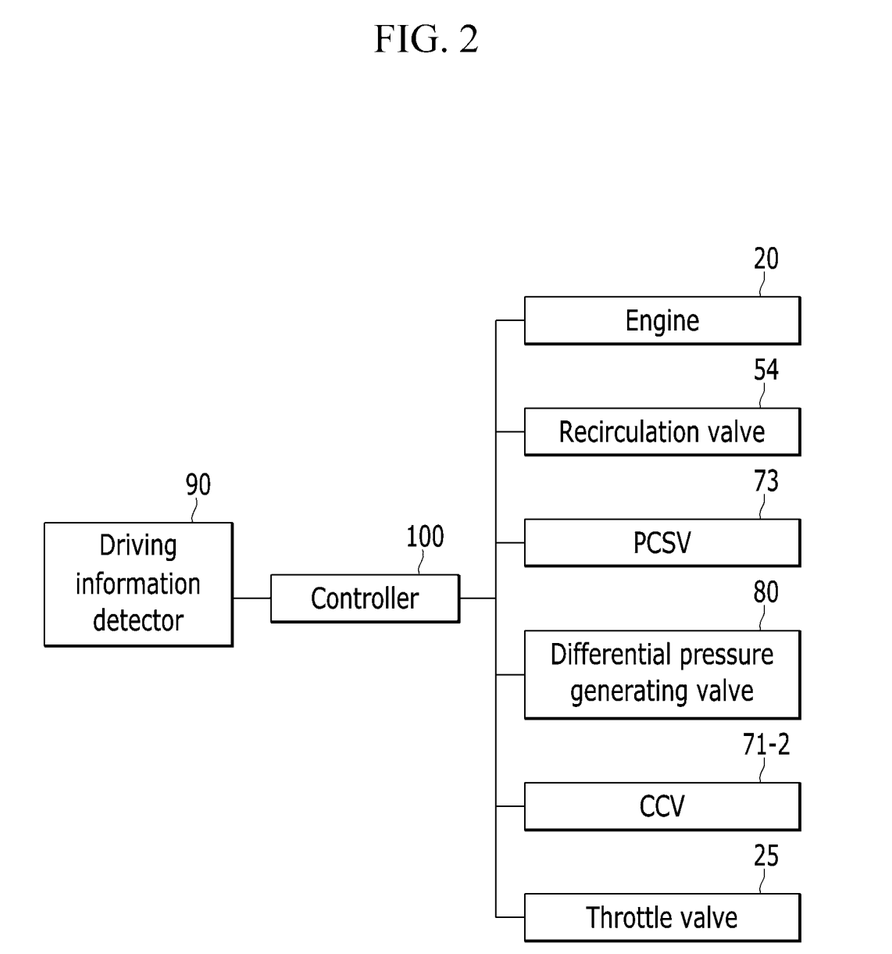
FIG. 2 is a block diagram illustrating a fuel vapor purge system according to an exemplary embodiment of the present invention.

FIG. 1 is a schematic view illustrating a fuel vapor purge system according to an exemplary embodiment of the present invention. FIG. 2 is a block diagram illustrating a fuel vapor purge system according to an exemplary embodiment of the present invention.

FIG. 1 and as shown in FIG. 2, the fuel vapor purge system according to an exemplary embodiment of the present invention includes an engine, a turbocharger 60, and an exhaust gas recirculation (EGR) system.

The engine includes a plurality of cylinders 21 having a combustion chamber 20 that generates driving power by burning fuel. The engine is provided with an intake line 10 through which intake gas to be supplied into the cylinder 21 flows, and an exhaust line 30 through which exhaust gas discharged from the cylinder 21 flows.

The air introduced through the intake line 10 is supplied into the cylinder 21 through an intake manifold 23. A throttle valve 25, which adjusts the air amount to be supplied into the cylinder 21, is mounted in the intake line 10 at a front end portion of the intake manifold 23.

A MAP sensor (manifold absolute pressure sensor) 27, which detects pressure of the intake manifold 23, is disposed in the intake manifold 23. Pressure detected by the MAP sensor is transmitted to a controller 100 which will be described in later.

The turbocharger 60 is provided between the intake line 10 and the exhaust line 30 and operated by exhaust gas discharged from the cylinder 21 to compress intake gas (outside air+recirculation gas) and supply the compressed intake gas into the cylinder 21. The turbocharger 60 includes a turbine 62 which is provided in the exhaust line 30 and rotates by exhaust gas discharged from the cylinder 21, and a compressor 64 which rotates in conjunction with the rotation of the turbine 62 and compresses intake gas.

Volatile fuel to be supplied into the cylinder 21 is stored in a fuel tank 70, and a canister 71 is connected to the fuel tank 70 through a vapor line and contains an absorbent material that may absorb fuel vapor generated in the fuel tank 70.

A purge control solenoid valve (PCSV) 73 is disposed in a main purge line 72 connected to the canister 71 and selectively blocks the fuel vapor collected in the canister 71.

An atmospheric path 71-1 is provided in the canister 71, and a canister closing valve (CCV) 71-2 is disposed in the atmospheric path 71-1. Opening or closing of the canister closing valve 71-2 is controlled by the controller. External air is selectively supplied to the canister 71 according to opening or closing of the canister closing valve 71-2.

A fuel pressure sensor 78, which detects fuel pressure, is disposed in the fuel tank 70. Fuel pressure detected by the fuel pressure sensor 78 is transmitted to the controller 100.

The main purge line 72 is divided into the first purge line 74 and a second purge line 76.

The first purge line 74 branches off from the main purge line 72 and merges into the intake line 10 at the downstream side of the turbocharger 60. A first check valve 75 is disposed in the first purge line 74, and the first check valve 75 prevents the fuel vapor flowing along the first purge line 74 from flowing reversely. The first check valve 75 prevents the air from flowing reversely in a boosting region.

That is, because of the first check valve 75, the fuel vapor, which flows along the first purge line 74, flows from the purge control solenoid valve 73 to the intake manifold 23, but does not flow in the reverse direction thereof.

The second purge line 76 branches off from the main purge line 72, and merges into the intake line 10. A second check valve 77 is disposed in the second purge line 76, and the second check valve 77 prevents the fuel vapor flowing along the second purge line 76 from flowing reversely. The second check valve 77 prevents fresh air from being introduced from the second purge line 76 when the region is not the boosting region.

That is, because of the second check valve 77, the fuel vapor, which flows along the second purge line 76, flows from the purge control solenoid valve 73 to the intake line at the front end portion of the compressor 64, but does not flow in the reverse direction thereof.

Meanwhile, a differential pressure generating valve 80 is disposed in the intake line 10 at the upstream side of the compressor 64. The differential pressure generating valve 80 is opened in a normal state, and closed by a predetermined amount as necessary to create negative pressure at the front end portion of the compressor 64.

That is, when the differential pressure generating valve 80 is closed by the predetermined amount, a flow velocity of the intake gas flowing to the compressor 64 is increased, and intake pressure at the u of the compressor 64 is decreased, forming negative pressure. This uses Bernouli's theorem.

A closing degree of the differential pressure generating valve 80 is determined based on a required amount of intake gas of the engine and a flow velocity of the intake gas according to an opening degree of the differential pressure generating valve 79, The required amount of intake gas of the engine may be detected by a driving information detector 90, The driving information detector 90 detects driving information including required torque and a required velocity for a driver, a speed of the engine, and a load of the engine, and the driving information is transmitted to the controller 100.

In the instant case, the required torque and the required velocity for a driver may be detected by an acceleration pedal sensor (APS) provided in a vehicle, the torque of the engine may be detected by a torque sensor, and the speed of the engine may be detected by a speed sensor.

An intake pressure sensor 82 is disposed in the intake line 10 between the differential pressure generating valve 80 and the compressor 64 of the turbocharger. Pressure of the intake line 10 detected by the intake pressure sensor 82 is transmitted to the controller 100.

The controller 100 may be an engine control unit (ECU) provided in the vehicle. The controller 100 controls operations of the engine, the turbocharger 60, the recirculation valve 54, the canister 71, the purge control solenoid valve 73, the canister closing valve 71-2 and the differential pressure generating valve 80.

To this end, the controller 100 may be configured by one or more processors which are operated by a predetermined program, and the predetermined program is configured to perform respective steps of a method for diagnosing leakage of a fuel vapor in a fuel vapor purge system according to another exemplary embodiment of the present invention.

The controller 100 determines the required amount of intake gas of the engine based on the driving information, and adjusts the closing degree of the differential pressure generating valve 80 based on the required amount of intake gas of the engine and the amount of the intake air according to the opening degree of the differential pressure generating valve 80. In the instant case, the amount of the intake air according to the opening degree of the differential pressure generating valve 80 may be saved in a form of map data in advance in the controller 100.

The exhaust gas recirculation system 50 is an apparatus which supplies a part of the exhaust gas discharged from the engine back into the engine. The exhaust gas recirculation system 50 includes a recirculation line 52 which branches off from the exhaust line 30 at a rear end portion (downstream)

of the turbine 62 of the turbocharger 60 and merges into the intake line 10 at a front end portion (upstream) of the compressor 64 of the turbocharger 60, an exhaust gas recirculation cooler (EGR cooler) which is disposed in the recirculation line 52, and a recirculation valve 54 which is disposed in the recirculation line 52.

The amount of recirculation gas, which is a part of exhaust gas that is discharged from the engine and will be supplied back into the engine, is adjusted by an opening degree of the recirculation valve 54. An operation of the recirculation valve 54 is controlled by control signals from the controller 90 to be described below.

The recirculation line 52 is branched from the exhaust line 30 at downstream side of the turbine 62, and merged into the intake line 10 between the compressor 64 and the differential pressure generating valve 80.

Negative pressure in the intake line 10 at the upstream side of the compressor 64 is generated by the differential pressure generating valve 80, and recirculation gas is easily supplied to the combustion chamber 20 by the negative pressure in the intake line 10.

Further, fuel vapor generated in the fuel tank 70 is easily supplied to the combustion chamber 20 passing through the intake line 10 at the upstream side of the compressor 64 by the negative pressure generated by the differential pressure generating valve 80.

That is, since fuel vapor and recirculation of the recirculation gas are easily supplied to the combustion chambers by use of one differential pressure generating valve 80, it is possible to reduce manufacturing cost of the vehicle.

Hereinafter, an operation of the fuel vapor purge system and a method for diagnosing leakage of a fuel vapor in the fuel vapor purge system will be described in detail with reference to the accompanying drawings.

Figure 3:
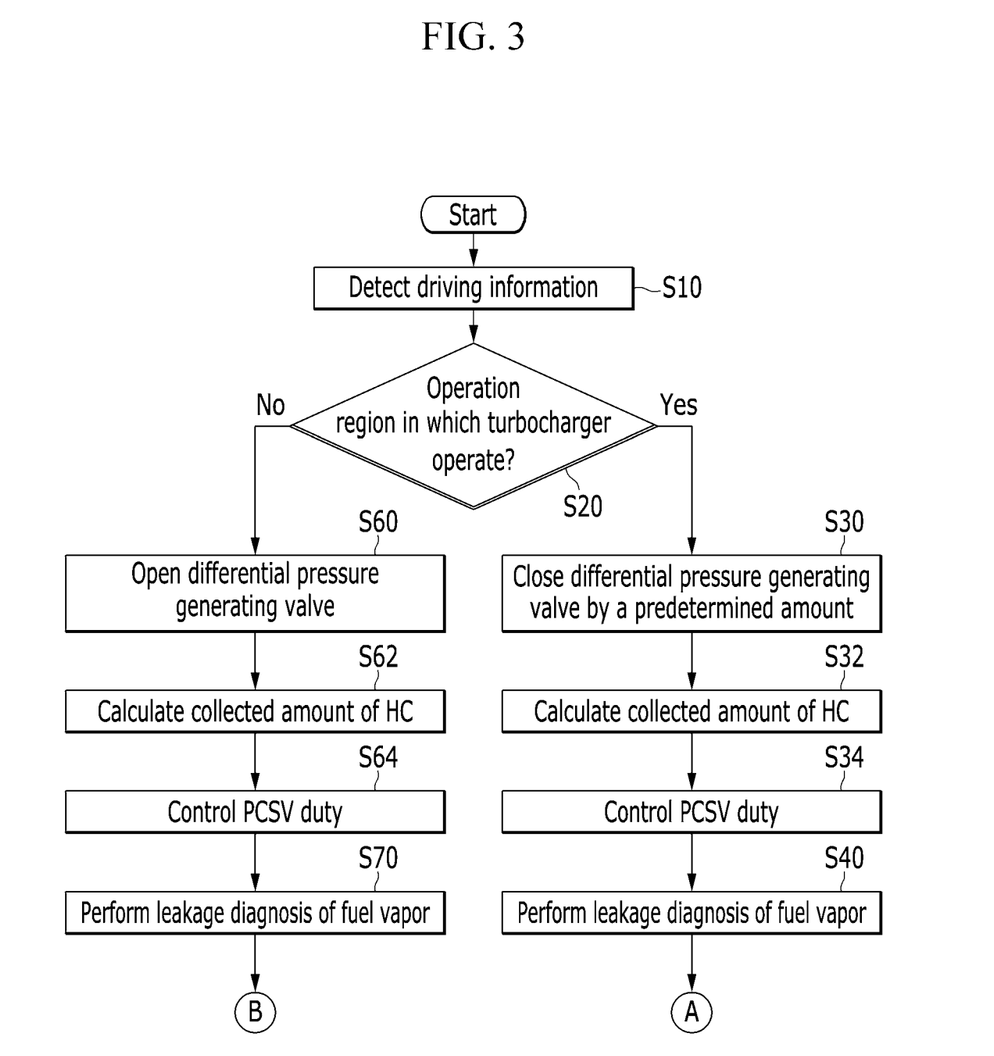
FIG. 3, FIG. 4 and to FIG. 5 are flowcharts illustrating a process of a fuel vapor purge system and a method for diagnosing leakage of fuel vapor according to an exemplary embodiment of the present invention.

FIG. 3 is flowchart illustrating a process of a fuel vapor purge system and a method for diagnosing leakage of fuel vapor according to an exemplary embodiment of the present invention.

As shown in FIG. 3, the driving information detector 90 detects the driving information including the required torque, the required velocity, the engine speed, and the engine load at step S10. The driving information detected by the driving information detector 90 is transmitted to the controller 100.

Further, the driving information detector 90 detects the driving information including pressure of the fuel tank 70, pressure of the intake manifold, and pressure of the intake line 10 between the differential pressure generating valve 80 and the compressor 64. The driving information is transmitted to the controller 100.

Pressure of the fuel tank 70 may be detected by the fuel pressure sensor 78, pressure of the intake manifold may be detected by MAP sensor 27, and pressure of the intake line 10 may be detected by the intake pressure sensor 82. That is, the driving information detector 90 may include the fuel pressure sensor 78, the MAP sensor 27 and the intake pressure sensor 82.

Based on the driving information, the controller 100 determines whether an operation region of the vehicle is an operation region in which the turbocharger 60 operates at step S20. For example, an operation region in which the turbocharger 60 operates may be a high-speed and high-load region, and an operation region in which the turbocharger 60 does not operate may be a low-speed and low-load region.

When the operation region is the operation region in which the turbocharger 60 operates, the controller 100 closes the differential pressure generating valve 80 by a predetermined amount at a maximum closing degree or less at step S30, forming negative pressure in the intake line 10 at the upstream side of the compressor 64.

In the instant case, a magnitude of the negative pressure formed in the intake line 10 is determined by the closing degree of the differential pressure generating valve 80, and the differential pressure generating valve 80 is closed at the maximum closing degree or less. The maximum closing degree may be determined based on the required amount of intake gas of the engine and the flow velocity of the intake gas according to the opening degree of the differential pressure generating valve 80. In the instant case, the required amount of intake gas of the engine may be determined based on the required torque for the driver.

When the differential pressure generating valve 80 is closed by a predetermined amount, negative pressure is formed at the front end portion of the compressor 64, but the amount of intake gas to be supplied into the engine through the intake line is decreased, and as a result, when the differential pressure generating valve 80 is excessively closed, output of the engine cannot be maintained because the intake gas is insufficient. Therefore, the closing degree of the differential pressure generating valve 80 for maintaining the output of the engine determined based on the required torque for the driver is the maximum closing degree. In the instant case, the output of the engine, the closing degree of the differential pressure generating valve in accordance with the required amount of intake gas, and the maximum closing degree may be saved in a form of a map table in advance in the controller 100.

The controller 100 determines the collected amount of hydrocarbon in the canister 71 at step S42. The controller 100 determines the concentration of hydrocarbon in the canister 71 based on the air amount to be introduced into the cylinder 21 of the engine and the amount of oxygen included in the exhaust gas, and may determine the collected amount of hydrocarbon based on the concentration of hydrocarbon. Because the method of determining the collected amount of hydrocarbon is apparent to those skilled in the art to which the present invention pertains, a specific description thereof will be omitted.

The controller 100 performs duty control of the purge control solenoid valve 73 in accordance with the collected amount of hydrocarbon at step S34, adjusting the amount of discharged fuel vapor.

In the instant case, the first check valve 75 is closed by negative pressure formed in the intake line 10 at the upstream side of the compressor 64 by the differential pressure generating valve 80, and the second check valve 77 is opened, and as a result, the fuel vapor, which is discharged through the purge control solenoid valve 73, is supplied into the engine through the intake line 10 at the upstream side of the compressor 64 via the second check valve 77.

The controller 100 performs leakage diagnosis that fuel vapor is leaked in the fuel vapor purge system at step S40.

Figure 4:
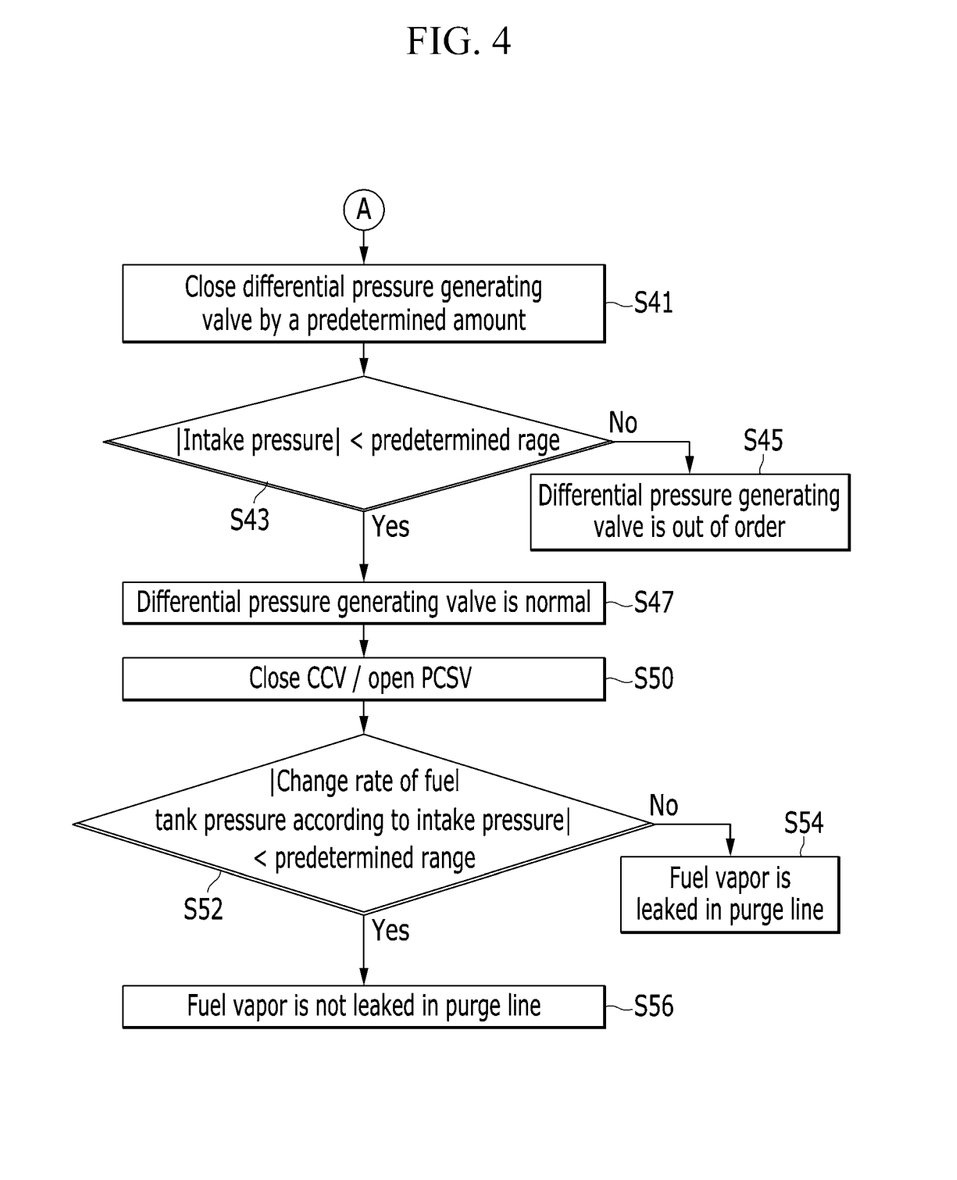

Referring to FIG. 4, the controller 100 closes the differential pressure generating valve 80 by a predetermined amount, generating negative pressure in the intake line 10 between the differential pressure generating valve 80 and the compressor 64 at step S41.

The controller 100 compares the negative pressure (intake pressure) in accordance with closing amount of the differential pressure generating valve 80 to a predetermined range at step S43.

When the negative pressure (intake pressure) in the intake line 10 is beyond the predetermined range, the controller 100 determines that the differential pressure generating valve 80 is out of order at step S45.

When the negative pressure (intake pressure) in the intake line 10 is within the predetermined range, the controller 100 determines that the differential pressure generating valve 80 is normal at step S47.

The controller 100 closes the canister closing valve 71-2 and opens the purge control solenoid valve 73 in a state where the differential pressure generating valve 80 is closed by the predetermined amount at step S50.

The controller 100 compares a change rate of the fuel tank pressure according to the intake pressure detected by the intake pressure sensor to a predetermined range at step S52. When change rate of fuel tank pressure is beyond the predetermined range, the controller 100 determines that leakage in the purge line (main purge line and second purge line) is occurred at step S54. In the instant case, the change rate of fuel tank pressure according to the intake pressure may be stored in a form of map data in advance in the controller 100.

When fuel vapor is not leaked in the purge line (main purge line and second purge line), negative pressure is generated in the intake line at the upstream side of the compressor as the differential pressure generating valve 80 is closed by the predetermined amount. At this time, the change rate of fuel tank pressure according to the intake pressure (negative pressure), which is generated by the differential pressure generating valve 80, is maintained in the predetermined range. However, the change rate of fuel tank pressure according to the intake pressure (negative pressure) is beyond the predetermined range, it is possible to determine that fuel vapor is leaked in the purge line (main purge line and second purge line).

Since negative pressure is generated in the intake line at the upstream side of the compressor 64 by the operation of the differential pressure generating valve 80 in an operation region in which the turbocharger operates and boost pressure by the compressor 64 is supplied to the intake manifold, the first check valve 75 is closed and the second check valve 77 is opened. Therefore, it is possible to determine that fuel vapor is leaked in the main purge line 72 and the second purge line in an operation region in which the turbocharger operates.

Figure 5:
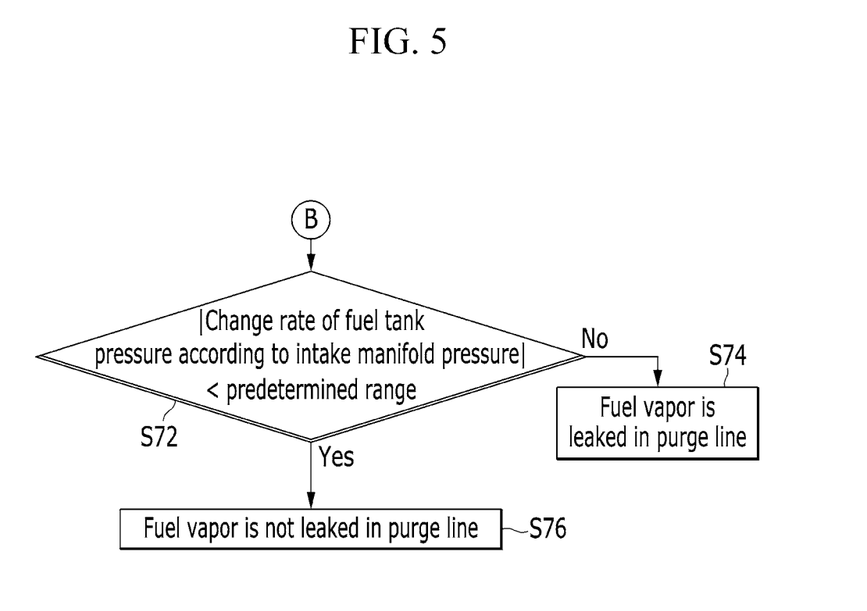

In the case of the operation region in which the turbocharger 60 does not operate, the controller 100 opens the differential pressure generating valve 79 at step S60, such that negative pressure is not formed in the intake line 10 at the front end portion of the turbocharger 60.

The controller 100 determines a collected amount of hydrocarbon in the canister 71 at step S62. The controller 100 determines a concentration of hydrocarbon in the canister 71 based on the air amount to be introduced into the cylinder 21 of the engine and the amount of oxygen included in the exhaust gas, and may determine the collected amount of hydrocarbon based on the concentration of hydrocarbon.

The controller 100 performs duty control of the purge control solenoid valve 73 in accordance with the collected amount of hydrocarbon at step S64, adjusting the amount of discharged fuel vapor.

The first check valve 75 is opened by negative pressure formed in the intake manifold 23, and the fuel vapor discharged through the purge control solenoid valve 73 is supplied into the intake manifold 23 through the first check valve 75.

The controller 100 performs leakage diagnosis that fuel vapor is leaked in the fuel vapor purge system at step S70.

The controller 100 determines that the change rate of the fuel tank pressure according to the intake manifold pressure detected by the MAP sensor 27 is within a predetermined range at step S72. In the instant case, the change rate of fuel tank pressure according to the intake manifold pressure may be stored in a form of map data in advance in the controller 100.

When the change rate of the fuel tank pressure according to the intake manifold pressure is beyond the predetermined range, the controller 100 determines that fuel vapor is leaked in the purge line (main purge line and first purge line) at step S74.

But the change rate of the fuel tank pressure according to the intake manifold pressure is within the predetermined range, the controller 100 determines that fuel vapor is not leaked in the purge line (main purge line and first purge line) at step S76.

Since the differential pressure generating valve 80 is opened in an operation region in which the turbocharger does not operate, negative pressure in the intake line at the upstream side of the compressor 64 and the intake manifold 23. Therefore, the first check valve 75 is opened and the second check valve 77 is closed. Accordingly, it is possible to determine that fuel vapor is leaked in the main purge line 72 and the first purge line.

As described above, according to the exemplary embodiment of the present invention, negative pressure is formed in the intake line at the upstream side of the compressor 64 by operation of the differential pressure generating valve 80 disposed in the intake line 10 at the upstream side of the compressor 64, such that a lot of fuel vapor is supplied to the combustion chamber in an operation region in which the turbocharger operates.

However, differential pressure between the upstream side and the downstream side of the recirculation valve 54 by closing control of the differential pressure generating valve 80 in an operation region in which the turbocharger does not operate, such that recirculation gas amount by the exhaust gas recirculation apparatus is increased and control stability of exhaust gas recirculation ratio (EGR ratio) is improved. In an operation region in which the turbocharger does not operate, fuel vapor is supplied to the intake manifold 23 passing through the first check valve 75, and does not supplied to the intake line 10 at the upstream side of the turbocharger 60. At this time, recirculation gas amount can be increased by closing control of the differential pressure generating valve 80, as necessary (i.e., when EGR ratio may be increased). That is, the differential pressure generating valve 80 may be selectively controlled in an operation region in which the turbocharger does not operate.

Further, failure of the differential pressure generating valve 80 and leakage of fuel vapor in the purge lines can be exactly diagnosed by use of the intake pressure sensor 82 disposed in the intake line 10 between the differential pressure generating valve 80 and the compressor 64.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fuel vapor purge system comprising:
   a turbocharger which includes a turbine disposed in an exhaust line through which exhaust gas discharged from an engine flows, and a compressor which rotates in conjunction with the turbine and compresses intake gas to be supplied into the engine;
   a canister which is connected to a fuel tank through a vapor line and collects fuel vapor of fuel stored in the fuel tank;
   a fuel pressure sensor which is configured to detect pressure in the fuel tank;
   a canister closing valve which selectively closes an atmospheric path provided in the canister;
   a purge control solenoid valve which is disposed in a main purge line connected to the canister and selectively closes the fuel vapor collected at the canister;
   a first check valve which is disposed in a first purge line that branches off from the main purge line and merges into the intake line at a downstream portion of the compressor of the turbocharger, and prevents the fuel vapor flowing along the first purge line from flowing reversely;
   a second check valve which is disposed in a second purge line that branches off from the main purge line and merges into the intake line at an upstream portion of the compressor, and prevents the fuel vapor flowing along the second purge line from flowing reversely;
   a differential pressure generating valve which is disposed in the intake line at an upstream portion of the compressor, and generates a negative pressure; and
   an intake pressure sensor which is disposed in the intake line between the differential pressure generating valve and the compressor.

2. The fuel vapor purge system of claim 1, further including:
   a controller which controls opening of the differential pressure generating valve and the canister closing valve according to an operation region of the turbocharger.

3. The fuel vapor purge system of claim 2, wherein
   the controller is configured to control that the differential pressure generating valve is opened in an operation region in which the turbocharger operates.

4. The fuel vapor purge system of claim 2, wherein
   the controller is configured to control that the differential pressure generating valve is closed by a predetermined value in an operation region in which the turbocharger does not operate.

5. The fuel vapor purge system of claim 4, wherein
   the differential pressure generating valve is closed at a maximum closing degree or less.

6. The fuel vapor purge system of claim 5, wherein
   a maximum closing degree is a closing degree of the differential pressure generating valve for maintaining output of the engine which is determined based on a required torque for a driver.

7. The fuel vapor purge system of claim 2, wherein
   the purge control solenoid valve is controlled based on a collected amount of hydrocarbon in the canister.

8. The fuel vapor purge system of claim 2, wherein
   the controller is configured to determine a failure of the differential pressure generating valve by comparing an intake pressure which is varied according to a closing degree of the differential pressure generating valve to a predetermined range.

9. The fuel vapor purge system of claim 2, wherein
   the controller is configured to determine whether fuel vapor is leaked in the purge lines by comparing the intake pressure to a pressure change rate of the fuel tank in a state where the differential pressure generating valve is closed by a predetermined value, the canister closing valve is closed, and the purge control solenoid valve is open.

10. The fuel vapor purge system of claim 1, further including:
    a recirculation line which branches off from the exhaust line at a downstream side and coupled to the intake line between the compressor and the differential pressure generating valve;
    a recirculation cooler which is disposed in the recirculation line; and
    a recirculation valve which is disposed in the recirculation line.

* * * * *